United States Patent
Zhong et al.

(10) Patent No.: US 10,904,667 B1
(45) Date of Patent: Jan. 26, 2021

(54) COMPACT AUDIO MODULE FOR HEAD-MOUNTED WEARABLE DEVICE

(71) Applicant: AMAZON TECHNOLOGIES, INC., Seattle, WA (US)

(72) Inventors: Xuan Zhong, San Jose, CA (US); Yuna Hu, Cupertino, CA (US); Chun Sik Jeong, Los Gatos, CA (US); Zhen Xu, Santa Clara, CA (US); Jung Sik Yang, Cupertino, CA (US); Shahram Talakoub, Cupertino, CA (US); Jianchun Dong, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/925,511

(22) Filed: Mar. 19, 2018

(51) Int. Cl.
*H04R 5/033* (2006.01)
*H04R 5/04* (2006.01)
*G02C 11/00* (2006.01)

(52) U.S. Cl.
CPC ........... *H04R 5/0335* (2013.01); *G02C 11/10* (2013.01); *H04R 5/04* (2013.01)

(58) Field of Classification Search
CPC ........ H04R 5/0335; H04R 5/04; H04R 1/028; H04R 2460/11; G02C 11/10; G02C 7/081; G02B 27/017; G02B 27/0176; G02B 2027/0178; G02B 15/02; G06F 1/163; G06F 1/1688; G06F 1/1639; G06K 18/0715; G06K 19/07762
USPC ......................................... 381/158, 374, 381
See application file for complete search history.

(56) References Cited

U.S. PATENT DOCUMENTS

| | | | | |
|---|---|---|---|---|
| 3,035,127 A | * | 5/1962 | Strzalkowski | G02C 11/06 381/23.1 |
| 3,076,062 A | * | 1/1963 | Fener | H04R 11/00 381/418 |
| 4,856,086 A | * | 8/1989 | McCullough | A61F 9/029 455/344 |
| 5,353,378 A | * | 10/1994 | Hoffman | G02C 11/10 704/258 |
| 6,301,367 B1 | * | 10/2001 | Boyden | A42B 1/245 2/209 |
| 8,766,940 B1 | | 7/2014 | Starner et al. | |
| 9,482,882 B1 | | 11/2016 | Hanover et al. | |
| 10,028,050 B2 | * | 7/2018 | Han | H04R 1/2834 |
| 10,129,647 B2 | * | 11/2018 | Seo | H04R 1/403 |
| 2006/0034478 A1 | * | 2/2006 | Davenport | H04R 5/0335 381/381 |
| 2006/0140433 A1 | * | 6/2006 | Castaneda | H04M 1/03 381/372 |

(Continued)

*Primary Examiner* — Binh Kien Tieu
(74) *Attorney, Agent, or Firm* — Lindauer Law, PLLC (57) ABSTRACT

A head-mounted wearable device (HMWD) with a form factor of eyeglasses incorporates a compact audio module with transducers that may be operated as an acoustic dipole or acoustic quadrupole. The audio module provides ducts that convey sound with a particular phase from a transducer to particular output ports. The phase of sound emitted from a first output port is opposite to the phase of sound emitted from a second output port. The audio module may include a pair of transducers, enabling operation as an acoustic dipole or quadrupole. The ducts are integrated into elements of the structure of the audio module, minimizing the overall size of the audio module.

21 Claims, 9 Drawing Sheets

(56) References Cited

U.S. PATENT DOCUMENTS

| | | | |
|---|---|---|---|
| 2006/0191740 A1* | 8/2006 | Abe | B60R 11/0217 |
| | | | 181/156 |
| 2009/0154755 A1* | 6/2009 | Yamagishi | H04R 5/033 |
| | | | 381/382 |
| 2011/0064255 A1* | 3/2011 | Lewis | G02C 11/10 |
| | | | 381/381 |
| 2011/0170054 A1* | 7/2011 | Jackson | G02C 11/10 |
| | | | 351/158 |
| 2012/0212593 A1* | 8/2012 | Na'aman | G09B 21/006 |
| | | | 348/62 |
| 2013/0293448 A1* | 11/2013 | Jannard | G02C 11/06 |
| | | | 345/8 |
| 2014/0112503 A1* | 4/2014 | Hebenstreit | H04R 1/00 |
| | | | 381/151 |
| 2014/0268016 A1* | 9/2014 | Chow | H04R 3/005 |
| | | | 351/158 |
| 2014/0270316 A1* | 9/2014 | Fan | G02C 11/10 |
| | | | 381/381 |
| 2015/0268475 A1* | 9/2015 | Lee | G02B 27/0176 |
| | | | 345/8 |
| 2015/0378180 A1* | 12/2015 | Blum | G06K 19/0715 |
| | | | 351/158 |
| 2016/0060926 A1* | 3/2016 | Kim | F16M 13/02 |
| | | | 361/679.01 |
| 2016/0246059 A1* | 8/2016 | Halpin | G02B 27/0176 |
| 2016/0316304 A1* | 10/2016 | Sprague | G02C 5/006 |
| 2017/0034608 A1* | 2/2017 | Besgen, Sr. | H04R 1/1066 |
| 2017/0075122 A1* | 3/2017 | Abdollahi | G02C 11/10 |
| 2017/0108714 A1* | 4/2017 | Kuczewski | G02C 5/02 |
| 2017/0142513 A1* | 5/2017 | Han | H04R 1/2834 |
| 2018/0167707 A1* | 6/2018 | Osterhout | G06F 1/163 |
| 2019/0238971 A1* | 8/2019 | Wakeland | H04R 1/24 |

* cited by examiner

COMPACT AUDIO MODULE FOR HEAD-MOUNTED WEARABLE DEVICE

BACKGROUND

Wearable devices provide many benefits to users, allowing easier and more convenient access to information and services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information.

The HMWD may operate independently as a standalone device or may operate in conjunction with another computing device. For example, the HMWD may operate in conjunction with a smart phone, tablet, network service operating on servers, and so forth. The HMWD includes input devices and output devices that provide a user interface to the user. In one implementation, the HMWD may use the computing device to provide access to a wide area network, compute resources, data storage, a display for image output, and so forth.

Among the input devices, the HMWD may include one or more microphones, such as an air conduction microphone (ACM) that detects sounds transferred by air or a bone conduction microphone (BCM) that detects sounds transferred by another medium such as the head of the user, and so forth.

Among the output devices, the HMWD may include one or more audio modules, a visual indicator device (VID), and so forth. As described below, the audio module provides sound that may be audible to the user during operation.

The volume available within the structure of the HMWD is extremely constrained. Traditional systems of providing audible output have either sidestepped the issue by using earplug speakers or produce audio that is of inferior quality due to physical limitations in the size. For example, traditional systems may exhibit poor frequency response during sound output. Additionally, traditional systems have lacked the ability to sufficiently direct the output sound to provide for different operational modes. For example, traditional systems have not been able to switch between a first mode in which audible sound is provided to a wearer while limiting sound presentation to bystanders, or a second mode in which the sound is presented to the wearer and bystanders.

Described in this disclosure is an audio module that is extremely compact and is able to provide particular acoustic patterns that enable these different operational modes. The audio module may utilize a pair of transducers that may be operated as acoustic dipoles or acoustic quadrupoles. During operation, the sound produced by the audio module may form an acoustic pattern having an acoustically null region that encompasses an expected location of the ears of bystanders. The structure of the audio module, as described below, provides ducts that direct sound of specific phase to specific ports at which the sound exits the HMWD. Sound comprises compressions and rarefactions in a medium, such as air, that change over time. These compression and rarefactions may be described as a time-varying sinusoidal waveform. A first sound and a second sound may both have the same waveform, but there may be a difference in phase between these two sounds. The phase may be indicative of a displacement or offset of one waveform relative to another. For example, a first waveform of the first sound and a second waveform of the second sound may be 180 degrees out of phase, resulting in a peak in the first waveform corresponding to a trough in the second waveform. The interaction of the sound emitted from these ports produces the desired acoustic pattern.

The acoustic pattern produced by the audio module may include a first region of sound, having a first phase, that is directed generally towards the ear of the user wearing the HMWD, while a second region of sound, having a second phase opposite the first phase, is directed generally upward. The sound produced by the audio module is audible to the user, while the bystanders are generally positioned in the acoustically null region formed by the audio module during operation. Within this acoustically null region, the first phase and second phase sound at least partially cancel one another out. The acoustic pattern may be measured by sampling sound pressure levels at a constant distance but different orientation with respect to the audio module.

In other implementations, the audio module may be operated such that audio is intentionally available to the wearer and those nearby. For example, the audio module may be operated as an acoustic dipole providing regions of sound with greater amplitude over a larger volume.

The structure of the audio module allows for a pair of relatively large transducers to be placed within a small volume. The transducers may comprise a membrane that, when driven by an actuator such as an electromagnetic coil, produces vibrations in the air. Because of this arrangement, each side of the membrane produces sound having a waveform with a particular phase, each phase being 180 degrees opposite the other. For example, when the membrane is displaced in a first direction, it produces a compression wave in that first direction having a first waveform exhibit a first phase and a rarefaction zone in the opposite direction that exhibits a second waveform with a second phase. At any given instant in time, the amplitude of the first waveform and the second waveform may be approximately equal but opposite in sign.

The audio module includes separate recesses and associated ducts for each of the transducers, isolating the sound output from each of the transducers within the audio module. For each transducer, sound produced from a first side of the transducer that has a first phase, is directed along a first duct to a first output port. Sound produced from a second side of the transducer, that has a second phase (opposite the first), is directed along a separate duct to a second output port. The first output port and the second output port may be on opposite sides of a perimeter or outer edge of the audio module. The output ports are generally located along an outer edge of the audio module. For example, while the membrane of the transducer may be in the X-Y plane and may be displaced along a Z axis, the sound, ultimately emitted from the ports, is generally directed along the X-Y plane.

For each transducer a first duct extends around an outer edge or perimeter of the second side of the transducer. The duct is bounded by the transducer itself, the bracket within which the transducer is retained, and a cover. The first duct then extends away from the transducer, through an output aperture in a side wall of the bracket. This output aperture is aligned with the first port. As sound is produced by the movement of the transducer, it travels along the first duct, through the output aperture, and out the first port into the surrounding environment.

Each transducer also has a second duct that extends from a volume that is proximate to the first side of the transducer. This second duct is bounded by the first side of the transducer and an inner side of a housing of the HMWD to which the audio module is affixed. The second duct is produced in part by the structure of the bracket that maintains the physical separation between the inner side of the housing and the first side of the transducer. The second duct then extends along an output feature that is located in the side wall of the bracket. This output feature is aligned with the third port. The third port in this example is on the opposite side of the bracket relative to the first port. As sound is produced by the movement of the transducer as it travels along the second duct, through down the output feature, and out the third port into the surrounding environment.

The arrangement of the transducers and routing of the respective ducts may be configured to produce particular phase outputs at particular ports on the HMWD. For example, the audio module may be located within the temple of the HMWD, with a first port and a second port on an upper side of the temple and a third port and fourth port on a lower side of the temple. The ducts in the audio module may be configured to direct output from the transducers such that sound (with a first phase) is emitted from the first and second ports, while sound (with a second phase) is emitted from the second and third ports. As a result, a particular acoustic pattern may be produced. By modifying the signals used to drive the transducers, a first acoustic pattern may be produced. For example, by driving the first transducer with a first signal and driving the second transducer with a second signal that is 180 degrees out of phase with the first signal, a second acoustic pattern may be produced.

By utilizing the devices and techniques described, sound from the audio module may audible to a user wearing the HMWD, while reducing one or more of the intelligibility or amplitude of sound perceived by bystanders. This improves privacy for the user while also minimizing adverse impact on bystanders resulting from hearing unwanted audio. The sound from the audio module is also improved as the physical size of the transducers used allows for improved frequency response, increased power dissipation compared to smaller transducers, and so forth. As a result, the user is presented with an improved user experience and able to utilize the HMWD in a variety of different ways.

Illustrative System

Figure 1A:
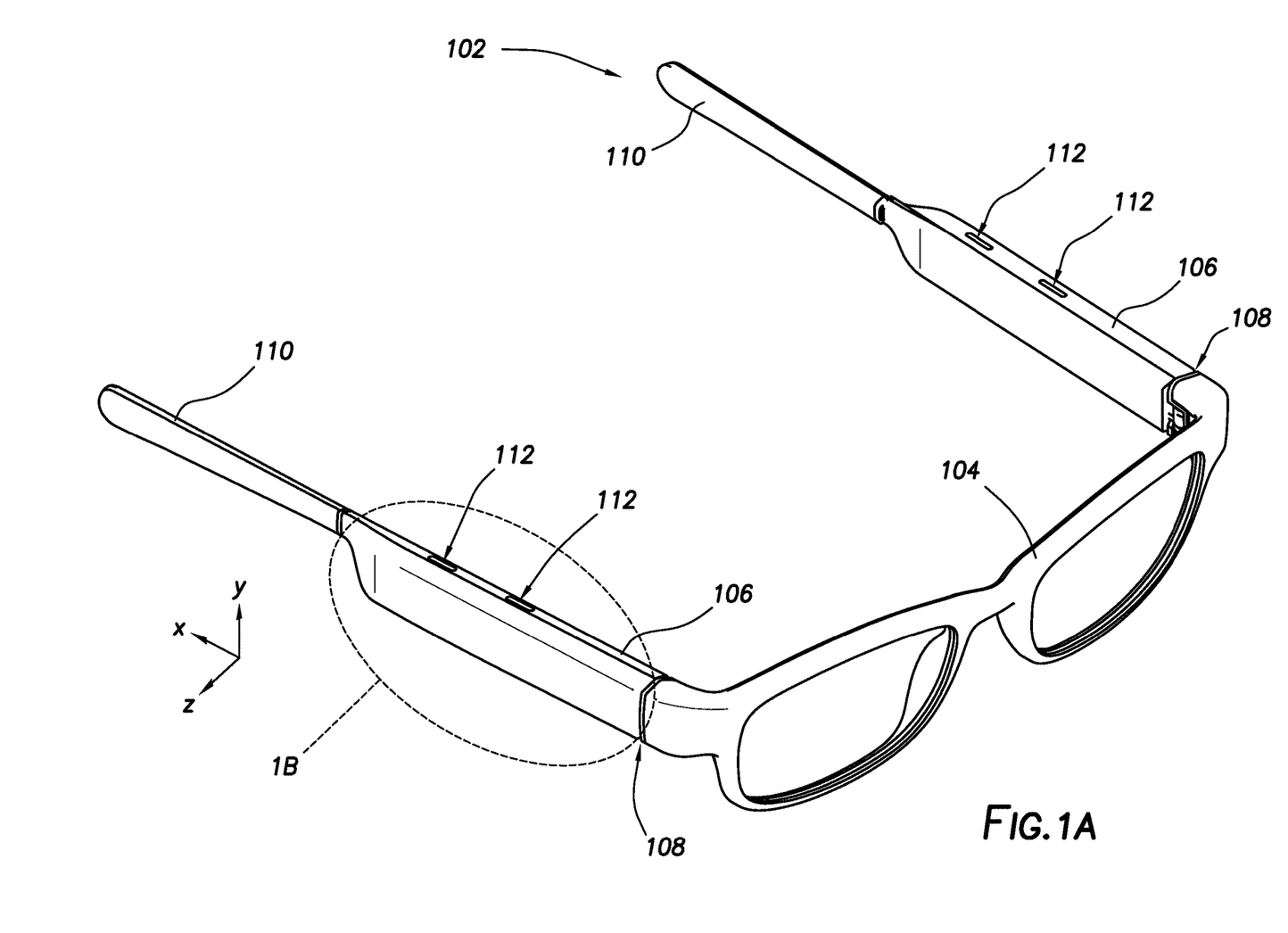
FIG. 1A depicts a head-mounted wearable device (HMWD) that incorporates a compact audio module in each of the temples, according to some implementations.

FIG. 1A depicts a head-mounted wearable device (HMWD) 102. The HMWD 102 is depicted here in a general form factor of eyeglasses. In other implementations, other form factors may be used such as headbands, devices worn on the ear, jewelry, handheld devices, and so forth.

In this implementation, the HMWD 102 in the eyeglasses form factor has a front frame 104 and left and right temples 106. Each temple 106 is connected to the front frame 104 by a hinge 108. Each of the temples 106 may include an earpiece 110 that, when the HMWD 102 is being worn, assist in retaining the HMWD 102 on a head of a user. The hinges 108 allow the temples 106 of the eyeglasses to be folded with respect to the front frame 104. The front frame 104 may include one or more lenses. The lenses may be shaped to provide a particular refractive effect on light rays, such as in the case of prescription lenses.

The temples 106 include a plurality of ports 112 through which sound produced by the audio module described below is emitted. In the implementation depicted here, there are two ports 112 on an upper surface of each temple 106 and two ports 112 on a lower surface of each temple 106.

The HMWD 102 may be in communication with one or more affiliated computing devices. For example, the HMWD 102 may communicate with the computing device using a personal area network (PAN) such as Bluetooth. The computing device may be used at least in part to provide additional resources, such as access to the network, compute resources, storage, display output, and so forth. The computing devices may comprise a smart phone, tablet, local server, in vehicle computer system, and so forth. For example, the computing device may comprise a smart phone that includes a display. The display of the smart phone may be used to present a graphical user interface.

The HMWD 102 may include one or more input devices. For example, the HMWD 102 may include one or more of a microphone, touch sensor, button, ambient light sensor (ALS), and so forth. The input devices may produce sensor data.

In some implementations a sensor may be used to determine if the HMWD 102 is being worn or not. For example, a proximity sensor may be used to determine if the head of the user is near the HMWD 102. Operation of the audio module may be changed responsive to whether the user is wearing the HMWD 102 or not. For example, when not being worn, the audio module may be configured to provide a different acoustic pattern. Continuing the example, when doffed, the HMWD 102 may configure the audio module to operate in a dipole or monopole mode that does not exhibit the acoustically null region, or exhibits a smaller acoustically null region, than described above.

The microphones may include one or more of bone conduction microphones (BCM) or air conduction microphones (ACM), and so forth. The microphones are used to produce audio input data. For example, the BCM may comprise an accelerometer, gyroscope, vibration sensor, and so forth that detect the vibrations in the head of the user that result from utterances of the user. The ACM may comprise a diaphragm or other elements that move in response to the displacement of air by sound waves. The audio input data may comprise digitized audio, such as pulse code modulated (PCM) audio data.

The touch sensor may be located on one or more of the temples 106 of the HMWD 102. The touch sensor may comprise a capacitive touch sensor, a force sensitive resistor touch sensor, an optical touch sensor, and so forth. The touch sensor may generate touch input data that is indicative of the location, direction, duration and so forth of the touch. For example, the touch input data may comprise a serialized data stream indicative of particular points on the touch sensor that detect a touch. Other sensors may provide other sensor data.

The HMWD 102 may include one or more output devices. For example, the HMWD 102 may include a visual indicator device (VID), haptic output devices, one or more audio modules, and so forth. The VID is capable of producing a visual signal that may be perceptible to the user who is wearing the HMWD 102. The visual signal may be presented along a portion of an interior of a front frame 104 of the HMWD 102 that is positioned in front of the user's face during normal wear. For example, the visual indicator device may comprise a light emitting diode (LED) that emits light from an opening of an inner cover of the front frame 104. The audio module produces audible output and is discussed in more detail below.

Figure 1B:
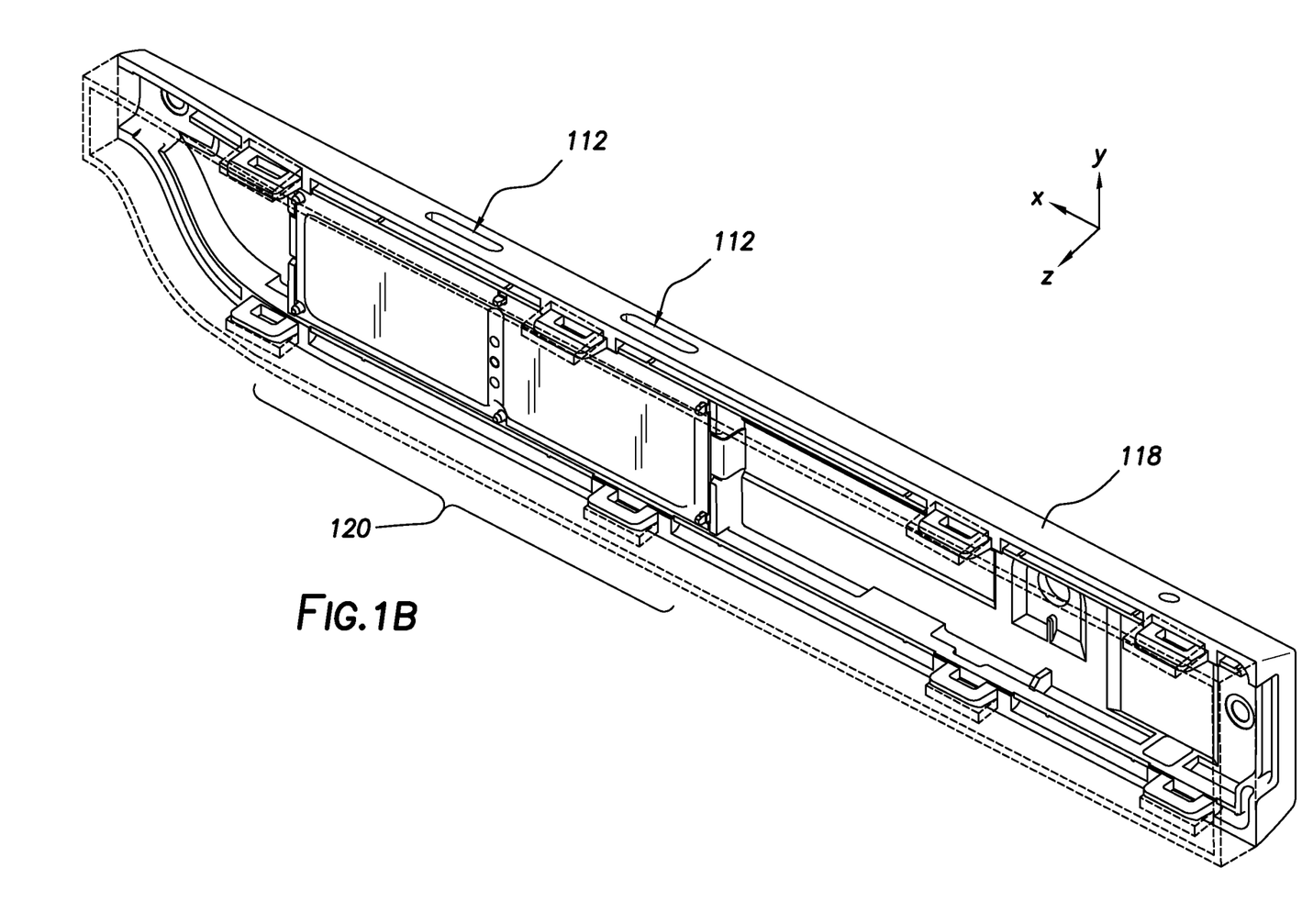
FIG. 1B depicts a view of an interior of a temple showing the audio module, according to some implementations.

FIG. 18 depicts an enlarged view of an interior of a temple 106. The temple 106 comprises a housing 118. The housing 118 and other structures described in this disclosure may comprise one or more materials, such as a metal, plastic, ceramic, composite material, and so forth. The housing 118 has an inner surface and an outer surface. The ports 112 provide a passage between the environment outside of the housing 118 and an audio module 120 that is within.

Other devices (not depicted) may be arranged within or affixed to the temple 106. For example, the temple 106 may include computing devices, batteries, sensors, input devices, output devices, and so forth.

Figure 2:
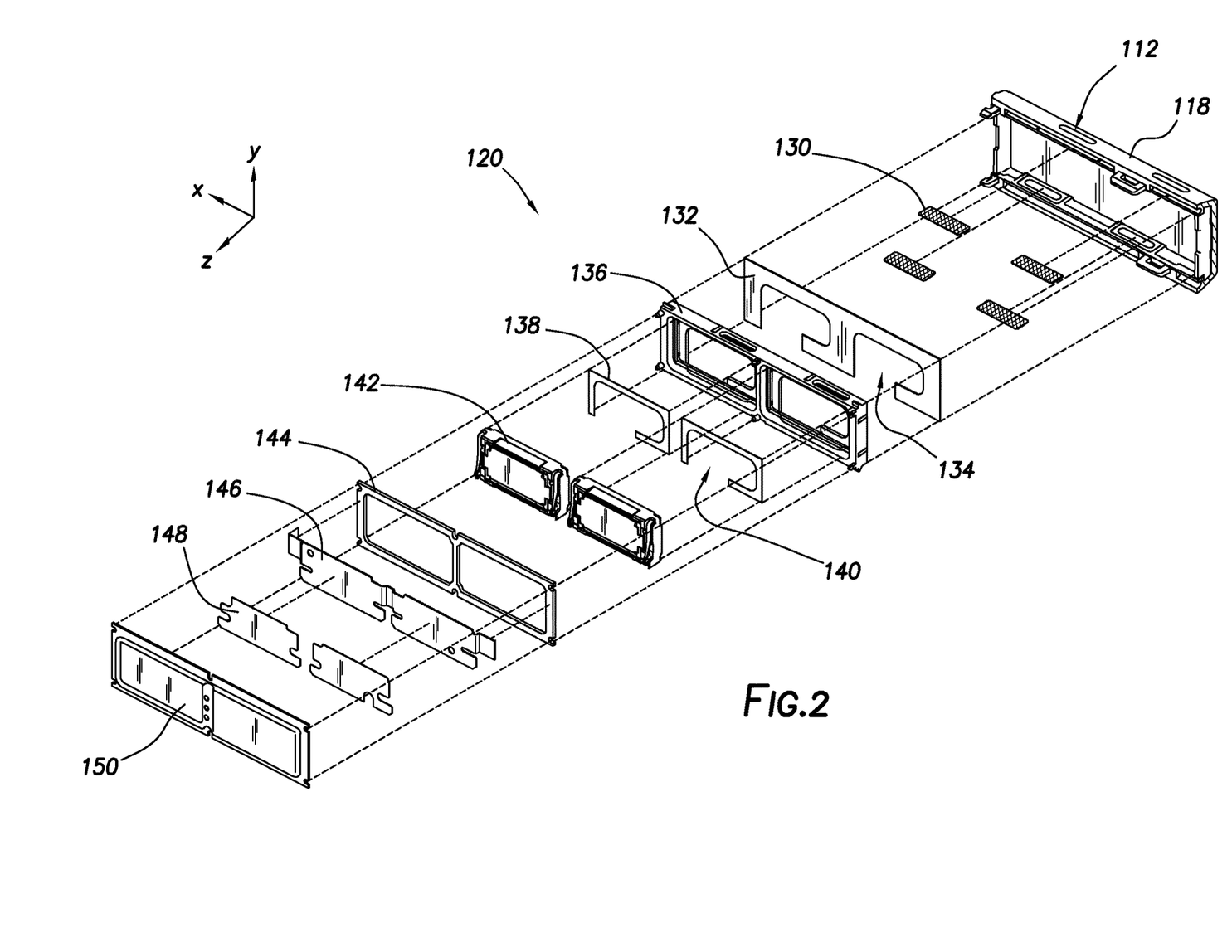
FIG. 2 depicts an exploded view of the audio module, according to some implementations.

FIG. 2 depicts an exploded view of the audio module 120, according to some implementations. A portion of the housing 118 is shown, and four ports 112 in the housing 118 are depicted.

A mesh 130 is positioned at an interior position of each of the ports 112. The mesh 130 may serve one or more functions, including audio impedance matching, preventing exterior contaminants from entering the temple 106, and so forth. In some implementations the mesh 130 may comprise a material that is overmolded onto the housing 118. In other implementations, other material may be used. For example, instead of a mesh 130, an elastomeric membrane may be used.

A first gasket 132 is arranged between the inner surface of the housing 118 a first side of a bracket 136. A perimeter of the first gasket 132 includes a first opening 134 and a second opening 134. The first gasket 132 provides a seal between the first side of the bracket 136 and the inner surface of the housing 118. The first gasket 132 may comprise one or more of a foam, elastomeric material, epoxy, fabric, and so forth.

The bracket 136 comprises a first recess and a second recess. Within each recess a first adhesive layer 138 may be arranged. For example, the first adhesive layer 138 may comprise a double-sided adhesive film. The first adhesive layer 138 includes an opening 140 in the perimeter. For example, the first adhesive layer 138 may appear to describe a "C" shape when viewed perpendicularly to its plane. When mounted to the bracket 136, the opening 140 in the perimeter of the first adhesive layer 138 is at least approximately adjacent to the opening 134 in the adjacent portion of the first gasket 132.

A first transducer 142 is mounted within the first recess and a second transducer 142 is mounted within the second recess. Each transducer 142 is joined to the bracket 136 by a respective first adhesive layer 138. For example, the first transducer 142 is joined to the interior surface of the first recess using the first adhesive layer 138.

Each transducer 142 may comprise a membrane that, when driven by an actuator such as an electromagnetic coil, produces vibrations in the air. Because of this arrangement, each side of the membrane is associated with a particular phase, each phase being 180 degrees opposite the other. For example, when the membrane is displaced in a first direction, is produces a compression wave (the first phase) in that first direction and a rarefaction zone (the second phase) in the opposite direction. Continuing the example, the changes in air pressure produced by the compression wave and rarefaction zone may be measured over time and used to produce a first waveform and a second waveform. These are time-varying sinusoidal waveforms in which, at any given point in time, the amplitude of the first waveform and the amplitude of the second waveform are approximately equal but of opposing sign.

In other implementations, the membrane or other structure may be moved using a different kind of actuator. For example, the transducer 142 may comprise a piezoelectric element that moves responsive to an electrical signal. The transducer 142 may itself comprise a body or casing within which the membrane, actuator, and other components are disposed. In the implementations described herein, the first transducer 142 and the second transducer 142 may have substantially the same operational specifications, physical size, and so forth. In other implementations, the first transducer 142 and the second transducer 142 may have different operational specifications, physical size, and so forth. For example, the first transducer 142 may exhibit a different frequency response compared to the second transducer 142.

A second gasket 144 is arranged proximate to the second side of the bracket 136. The second gasket 144 extends along a perimeter of the bracket 136 and includes an internal divider that separates the first recess from the second recess.

A flexible printed circuit (FPC) 146 may be arranged to extend across the second sides of the transducer's 142 and exits one or both ends of the audio module 120. The FPC 146 may comprise one or more electrically conductive pathways that are used to provide signals that drive the transducer's 142. A first side of the FPC 146 may include electrically conductive pads that come into contact with electrically conductive spring contacts on each of the transducer's 142, providing an electrically conductive pathway from outside of the audio module 120 the transducers 142 within.

One or more adhesive patches 148 or deposits are used join the second side of the FPC 146 to a portion of first side of the cover 150 for example, to adhesive patches 148 may be used, one adhesive patch 148 being adjacent to the first transducer 142 and the second adhesive patch 148 being adjacent to the second transducer 142. The adhesive patch 148 may comprise a carrier or structure, such as a paper or tape, that is infused with an adhesive material. In other implementations the adhesive patch 148 may comprise adhesive that is deposited on a surface, such as the second side of the FPC 146. When assembled, the second gasket 144 provides a seal between the first side of the cover 150 and the second side of the bracket 136.

A portion of the FPC 146 may extend past or through the second gasket 144 outside of the audio module 120.

In other implementations, electrically conductive elements may be included within the bracket 136, the cover 150, and so forth, to provide electrical conductive pathway to the transducers 142 without the FPC 146 being routed past the second gasket 144. For example, the cover 150 may comprise an electrical insulator within which are embedded electrically conductive patches that are configured to come into contact with the spring contacts of the transducers 142 when the audio module 120 is assembled.

In some implementations, instead of or in addition to the use of adhesives, other techniques may be used to join the components described herein. For example, components may be joined using heat, pressure, welding, mechanical fasteners, mechanical engagement features, and so forth. For example, the transducer 142 may be joined to the bracket 136 by using ultrasonic welding. In another example, the bracket 136 may be overmolded onto at least a portion of the transducers 142.

When assembled, the arrangement of the components described herein form ducts through which sound is directed from the transducers 142 to the ports 112. Each transducer 142 is associated with at least two ducts, each duct being used to transfer sound of the particular phase to a respective port 112. In the implementation depicted here, the arrangement of the transducers 142 and the ducts within the audio module 120 are such that sound from each of the transducers 142 that exhibits a first waveform with a first phase is emitted from the ports 112 on the upper surface of the housing 118 while sound from each of the transducers 142 that exhibits a second waveform with a second phase is emitted from the ports 112 on the lower surface of the housing 118. In some implementations the first phase and the second phase may differ by 180 degrees. For example, the amplitude of the first waveform and the second waveform may be approximately equal at a particular point in time, but opposite in sign.

It is understood that in other implementations the structures described herein may be modified such that the phase of the sound produced by one transducer 142 that is emitted from the respective ports 112 may be reversed with respect to the other transducer 142. For example, by modifying the structures described herein, the first transducer 142 may emit sound that exhibits a first waveform with a first phase from the first port 112 on the upper surface while the second transducer 142 may emit sound that exhibits a second waveform with a second phase from the second port 112 that is also on the upper surface.

While the audio module 120 is depicted here as comprising a variety of individual components, in other implementations one or more of these components may be combined into single structures. For example, using an additive manufacturing process, the housing 118 and the bracket 136 may be produced as a single piece, omitting the first gasket 132. In another example, the housing 118 and the bracket 136 may be formed as a single piece using injection molding.

When assembled, the audio module 120 is extremely compact. For example, the audio module 120 may be less than 4 mm thick as measured from the first set the bracket 136 to the second side of the cover 150. The audio module 120 may be less than 10 mm wide and less than 30 mm in length. The size of the audio module 120 may be scaled accordingly to be used in larger or smaller devices.

By placing the transducers 142 such that their respective diaphragms are effectively perpendicular to the ultimate direction in which the sound they produce is output, the audio module 120 is able to incorporate transducers 142 with a relatively large diaphragm surface area in a very low-profile package. For example, the ports 112 are positioned along at least two outer edges, such as the upper surface and a lower surface of the housing 118. The planes of these upper and lower surfaces are not parallel to a plane of the diaphragms in either of the transducers 142.

Figure 3:
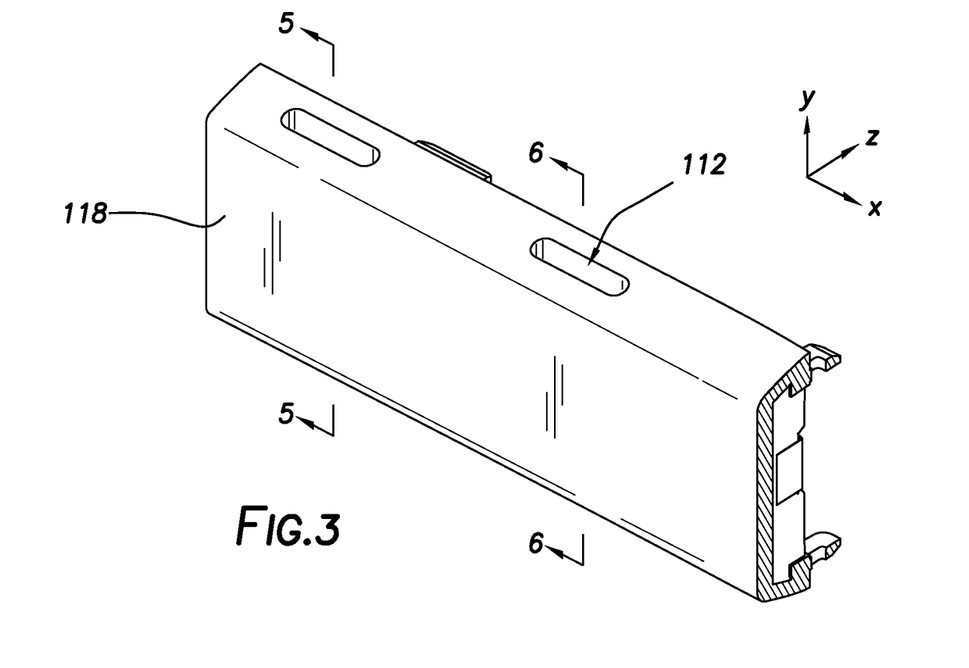
FIG. 3 depicts an exterior view of a housing of the audio module, according to some implementations.

FIG. 3 depicts an exterior view of a portion of the housing 118 of the audio module 120, according to some implementations. In this view, the upper ports 112 and housing 118 are visible along with an exterior of the housing 118. Also shown are indicia showing the relative location of the cross-sections of the device that are shown in FIGS. 5 and 6, respectively.

Figure 4:
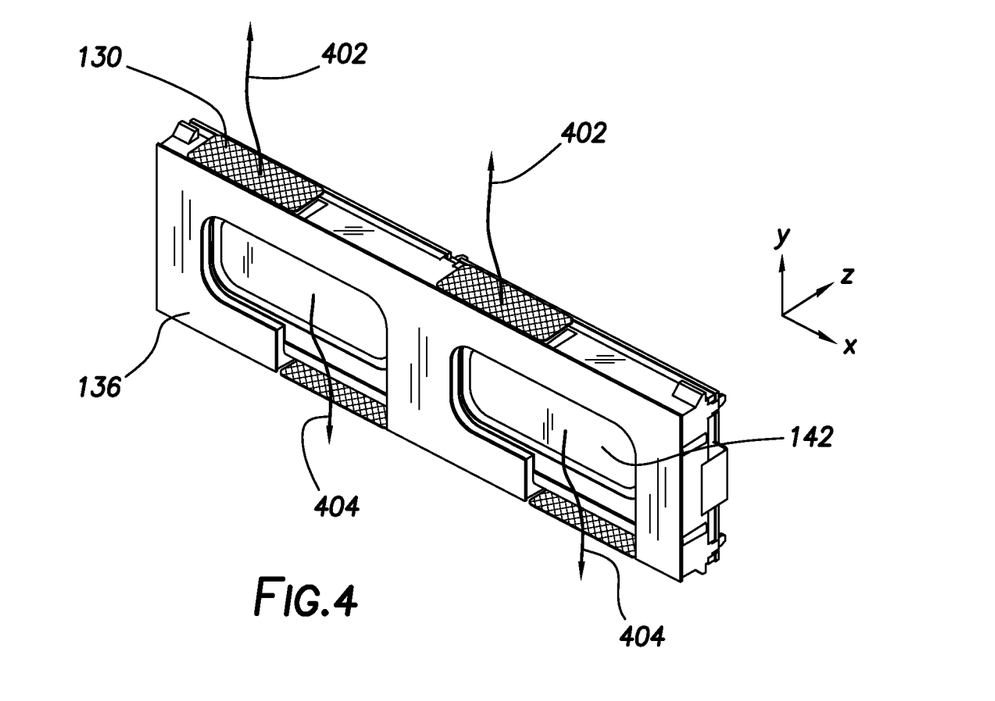
FIG. 4 depicts a view of the audio module of FIG. 3 with the housing removed, according to some implementations.

FIG. 4 depicts a view of the audio module 120 of FIG. 3 with the housing 118 removed, according to some implementations. With the portion of the housing 118 removed, the interior arrangement of the audio module 120 is visible. Sound, exhibiting a second waveform with a second phase 402, is depicted as being emitted after passing through the mesh 130 associated with output apertures for each of the transducers 142, where it would pass into the outside environment through the respective ports 112 on the upper surface of the housing 118. This is the sound that is generated by the second side of the transducer 142. Likewise sound, exhibiting a first waveform with a first phase 404, is depicted as being emitted from the first side of the transducers 142. The sound exhibiting the first phase 404 passes through the respective pieces of mesh 130 and into the outside environment through the respective ports 112 on the lower surface of the housing 118. When assembled, the first adhesive layer 138 (not shown) joins the first side of the bracket 136 that is depicted here to the inner surface of the housing 118.

Figure 5:
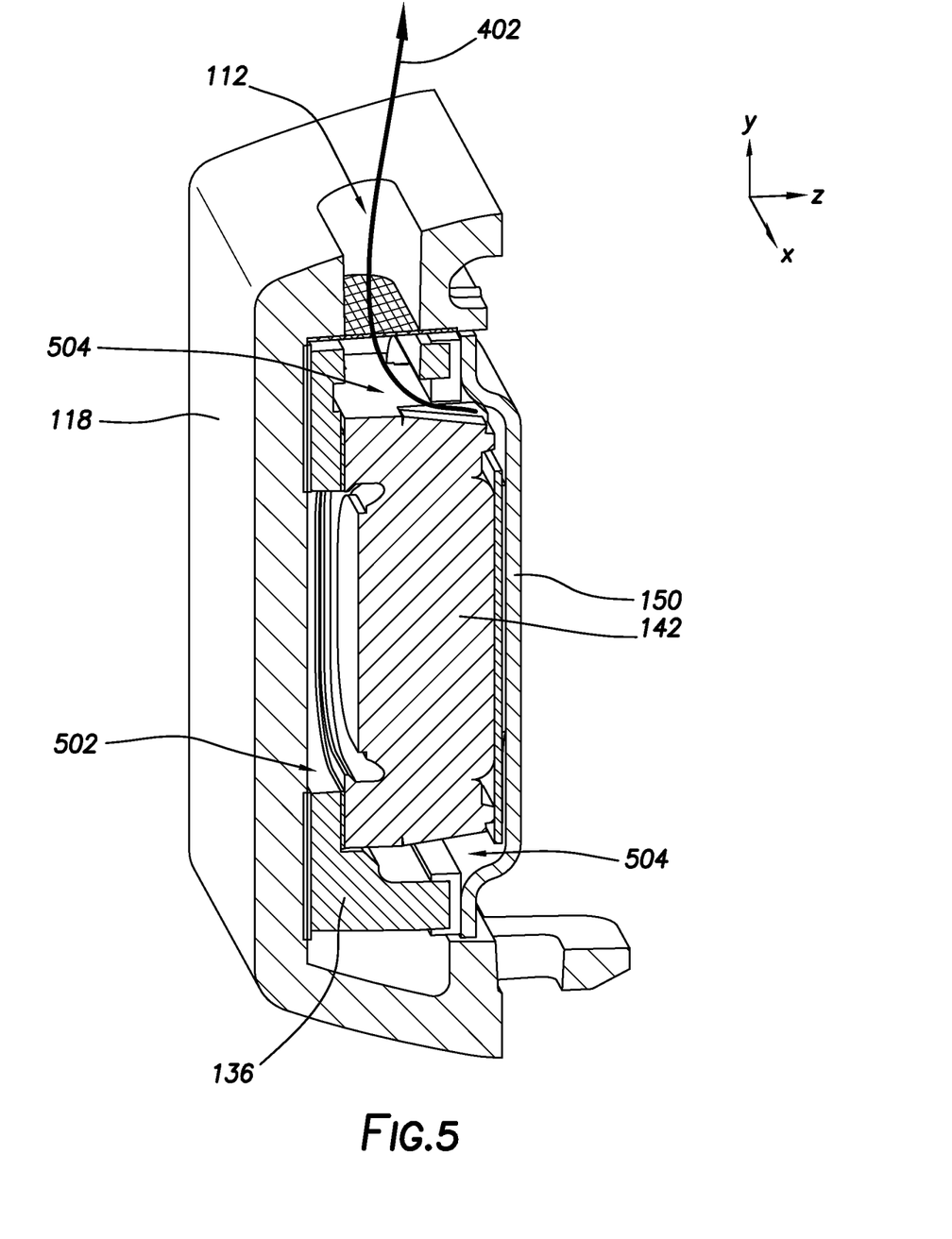
FIG. 5 depicts a cross sectional view of the temple, depicting the ducts for directing sound from the transducer to the ports, according to some implementations.
Figure 6:
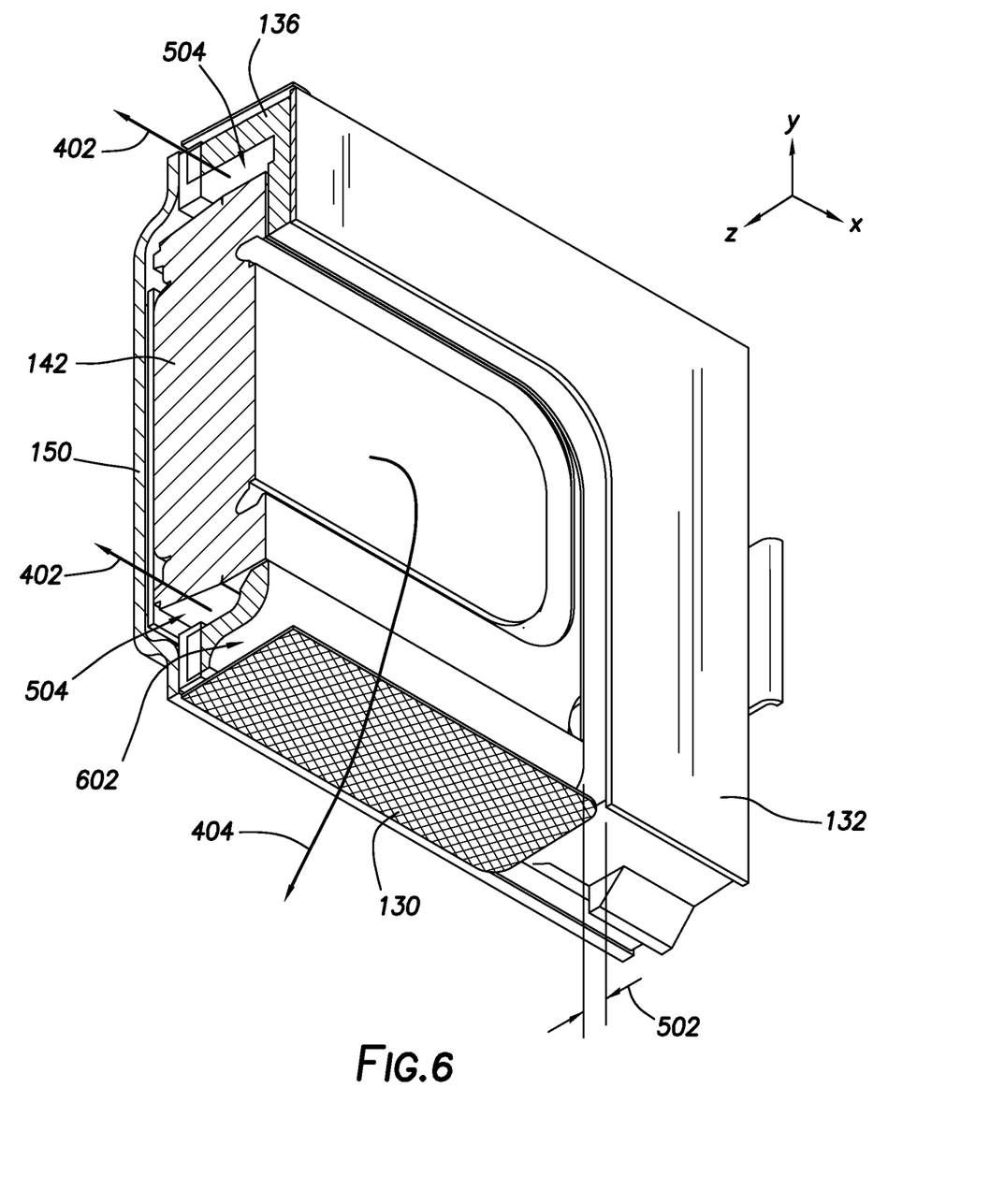
FIG. 6 depicts a cross sectional view of the audio module, depicting the duct for directing sound from the transducer to the ports, according to some implementations.

FIG. 5 depicts a cross sectional view of the temple 106 along the plane indicated in FIG. 3, according to some implementations. The transducer 142 has a first side and a second side and an edge that extends from the first side of the second side along the perimeter of the transducer 142.

As depicted here, a first duct 504 extends from the second side of the transducer 142 along the edge or perimeter of the transducer 142 to an output aperture. The output aperture is adjacent to the port 112. The first duct 504 extends along at least a portion of the edge of the transducer 142. As a result, sound that is emitted from the second side of the transducer 142 is conveyed through the first duct 504 and out the associated port 112. Sound from the second side of the transducer 142 may be emitted from the housing of the transducer 142 along an edge or side of the transducer's 142 housing. For example, in this illustration the transducer 142 emits sound, with the second phase 402, from ports along a side of the housing of the transducer 142.

A second duct 502 extends from the first side of the transducer 142. As described below, this second duct 502 extends to an output feature which is adjacent to a port 112. The first duct 504 and the second duct 502 are separated from one another by the various structures of the audio module 120 including the bracket 136.

FIG. 6 depicts a cross sectional view of the audio module 120 along the plane indicated in FIG. 3, according to some implementations. In this depiction, the housing 118 has been omitted to allow the inner details to be seen.

In this view, the first duct 504 is visible extending along the edges of the transducer 142 and bounded by the bracket 136 and the cover 150. Sound, with the second phase 402, is depicted as passing through this first duct 504. The second duct 502 is shown that extends from the first side of the transducer 142. The second duct 502 is formed by a portion of the bracket 136 and the first gasket 132 that maintain a gap between the first side of the transducer 142 and the inner surface of the housing 118. The second duct 502 is further bounded by an output feature 602 that part of the bracket 136. The output feature 602 may exhibit a curved cross-section such as shown here. In other implementations, other cross sections may be used. The output feature 602 directs the sound, with the first phase 404, from the transducer 142 to a corresponding mesh 130 and out into the outside environment.

Figure 7:
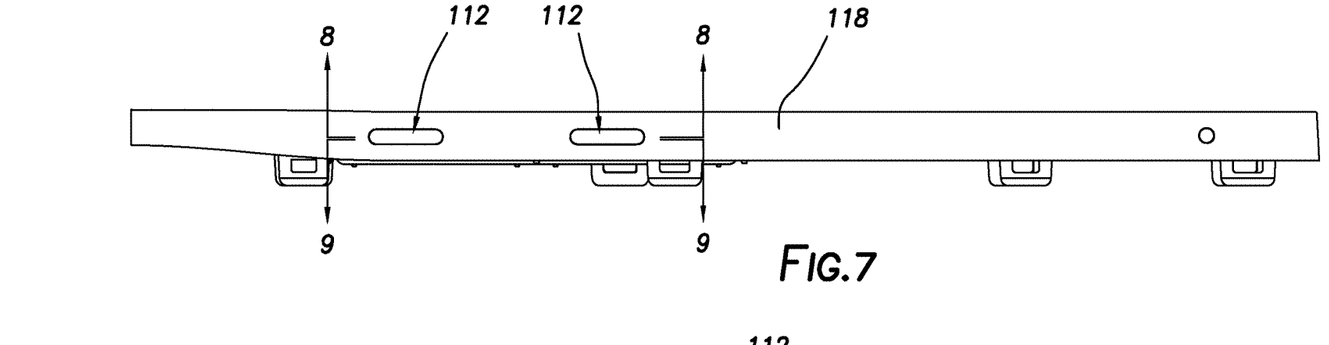
FIG. 7 depicts a view of an upper portion of the temple, according to some implementations.
Figure 8:
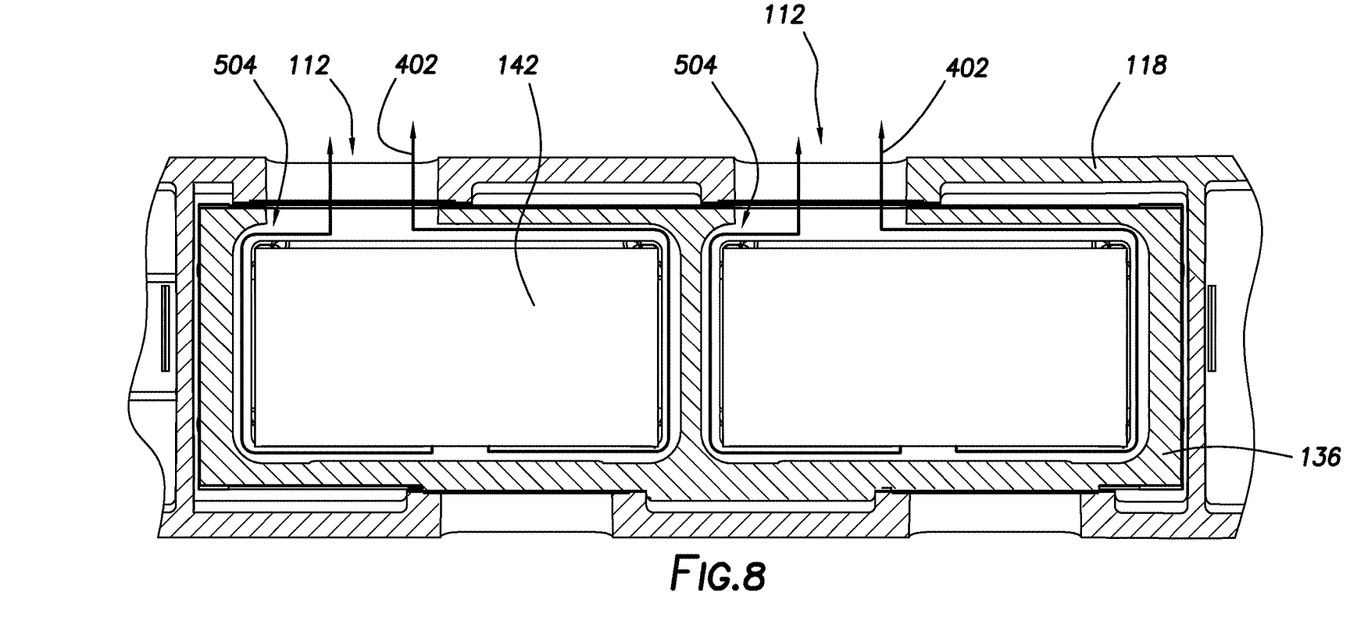
FIG. 8 depicts a cross section of the temple including the audio module, depicting a first set of ducts around a perimeter or edge of the transducers that direct sound to one side of the transducers to the ports, according to one implementation.
Figure 9:
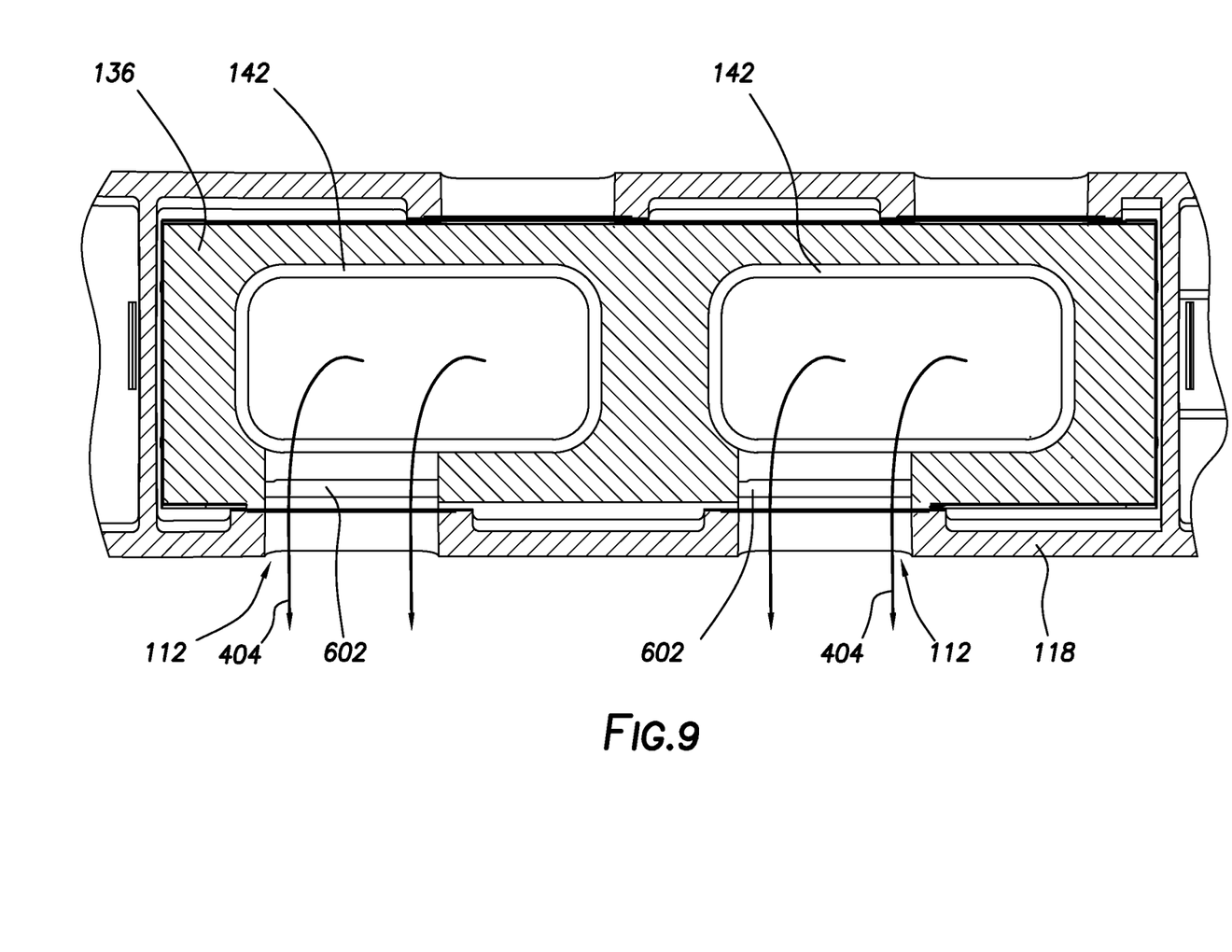
FIG. 9 depicts a cross section of the temple including the audio module, depicting a second set of ducts that direct sound from another side of the transducers to the ports, according to one implementation.

FIG. 7 depicts a view of an upper portion of the temple 106, according to some implementations. Also shown are indicia showing the relative location of the cross-sections of the device that are shown in FIGS. 8 and 9, respectively. The first port 112 and the second port 112 in the housing 118 are visible on the upper surface of the temple 106.

FIG. 8 depicts a cross section of the device along the plane indicated in FIG. 7. The first duct 504 extending around the edge of each of the transducers 142 is visible here. Also shown is the route traveled by sound, with the second phase 402, as it passes through the first duct 504. The sound, with second phase 402, is emitted from the second side of the transducer 142 and exits the bracket 136 through an output aperture that corresponds to a respective port 112 in the housing 118. As described above, a mesh 130 or other material may be arranged within the port 112.

FIG. 9 depicts a cross section of the device along the plane indicated in FIG. 7. The second duct 502 includes the gap between the first side of the transducer 142 and the inner surface of the housing 118 as well as the gap between the output feature 602 and the inner surface of the housing 118. The second duct 502 provides a route to the outside environment for the sound, with a first phase 404, that is emitted from the first side of the transducer 142. The output feature 602 corresponds to a respective port 112 in the housing 118. As described above, a mesh 130 or other material may be arranged within the port 112.

Figure 10A:
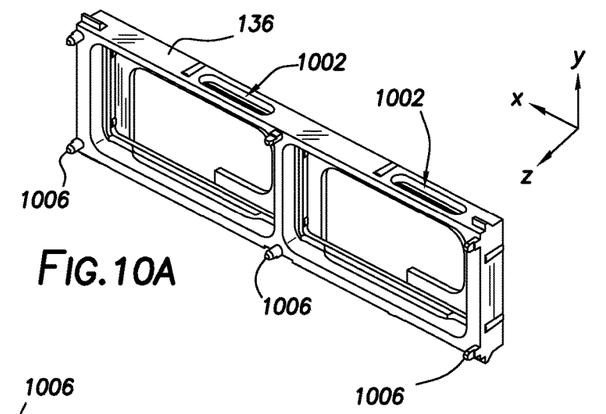
FIGS. 10A-10D depict various views of a bracket of the audio module from different angles, according to one implementation.

FIGS. 10A-10D depict various views of the bracket 136 of the audio module 120 from different angles, according to one implementation. FIG. 10A depicts output apertures 1002 in the bracket 136, through which the sound, with the second phase 402, exit the bracket 136 and be passed to the proximate ports 112 (not shown). Each transducer 142 in the bracket 136 has an associated output aperture 1002 in a perimeter or wall of the bracket 136. Also shown are features 1006 at various points on the bracket 136. The features 1006 may be used to provide for alignment between the bracket 136 in other parts, such as the cover 150, the housing 118, and so forth. The features 1006 may comprise mechanical engagement features, welding features, and so forth.

Figure 10B:
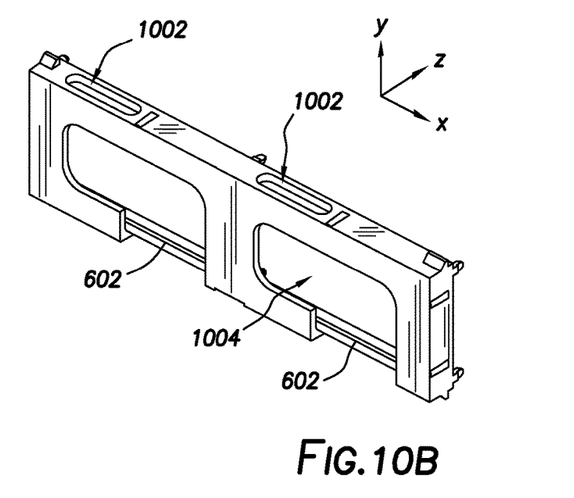
Figure 10C:
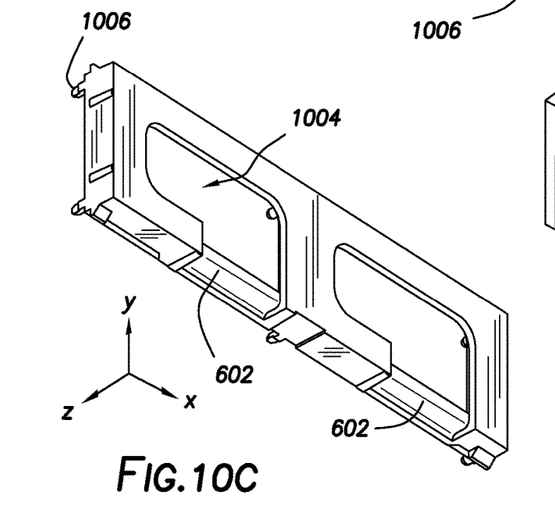

FIGS. 10B and 10C depict the output features 602 of the bracket 136. Each of the recesses in the bracket 136 has an associated output feature 602. A recess aperture 1004 for each of the recesses is shown for a portion of the first side of the bracket 136. The thickness of the bracket 136 that is proximate to the recess aperture 1004 is used to provide at least in part, the second duct 502.

Figure 10D:
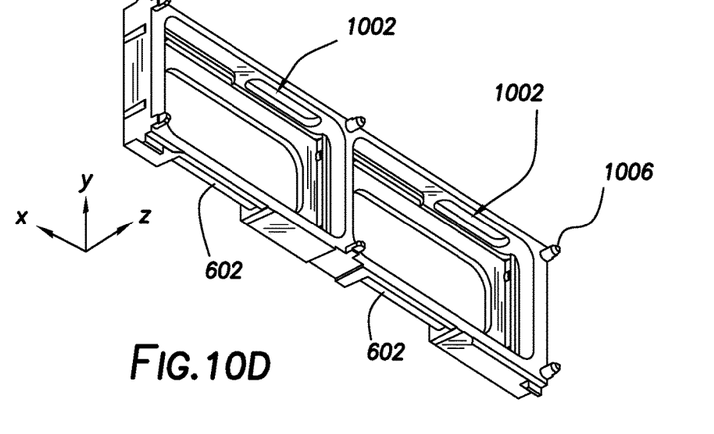

FIG. 10D depicts the second side of the bracket 136 from another angle, showing the output apertures 1002, the output features 602, and the features 1006.

While the first ducts 504 and the second ducts 502 for each of the respective transducers 142 is described as being symmetrical with one another, in other implementations other configurations may be used. For example, an output aperture 1002 may be adjacent to an output feature 602 on the same side of the bracket 136.

The implementations depicted include two audio modules 120. In another implementation (not shown) a single audio module 120 may be used. The single audio module 120 may direct sound to two or more ports 112. For example, the implementation of a single audio module 120 may include ducts as described herein to direct sound, with a first phase, to two ports 112 on an upper surface and sound, with a second phase, to two ports on a lower surface of the housing 118.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
a front frame comprising a first hinge; and
a first temple connected to the first hinge, wherein the first temple comprises:
  a housing having an upper surface and a lower surface;
  a first output port and a second output port in the upper surface;
  a third output port and a fourth output port in the lower surface; and
  an audio module comprising:
    a bracket having a first side and a second side;
    a first transducer mounted within a first recess of the bracket, the first transducer having a first side and a second side, wherein during operation sound produced by the first side of the first transducer has an opposite phase relative to sound produced by the second side of the first transducer;
    a second transducer mounted within a second recess of the bracket, the second transducer having a first side and a second side, wherein during operation sound produced by the first side of the second transducer has an opposite phase relative to sound produced by the second side of the second transducer;
    a first gasket between an inner surface of the housing and the first side of the bracket, wherein the first gasket comprises a first opening and a second opening in a perimeter of the first gasket;
    a first adhesive layer affixed to an inside of the first recess that joins the first transducer to the bracket, wherein the first adhesive layer has a third opening in a perimeter of the first adhesive layer that coincides with the first opening in the first gasket;
    a second adhesive layer affixed to an inside of the second recess that joins the second transducer to the bracket, wherein the second adhesive layer has a fourth opening in a perimeter of the second adhesive layer that coincides with the second opening in the first gasket;
    a flexible printed circuit having a first side and a second side, wherein the first side of the flexible printed circuit is adjacent to the second side of the first transducer and the second side of the second transducer;
    a cover having a first side and a second side;
    a second gasket that is between the first side of the cover and the second side of the bracket, wherein the second gasket extends along a perimeter of the cover and includes an internal divider that isolates the first recess from the second recess;
    a first adhesive and a second adhesive that join the second side of the flexible printed circuit to a portion of the first side of the cover; and
    wherein:
      the first recess includes a first duct that extends from the second side of the first transducer along an edge of the first transducer to a first output aperture in a perimeter of the bracket, and wherein the first output aperture corresponds to the first output port;
      the second recess includes a second duct that extends from the second side of the second transducer along an edge of the second transducer to a second output aperture in the perimeter of the bracket, and wherein the second output aperture corresponds to the second output port;
      a first portion of the bracket proximate to the first recess includes a third duct extending from the first side of the first transducer to a first output feature in the perimeter of the bracket, wherein the third duct is bounded at least in part by the housing, and further wherein the first output feature corresponds to the first opening in the first gasket and the third output port; and
      a second portion of the bracket proximate to the second recess includes a fourth duct extending from the first side of the second transducer to a second output feature in the perimeter of the bracket, wherein the fourth duct is bounded at least in part by the housing, and further wherein the second output feature corresponds to the second opening in the first gasket and the fourth output port.

2. The head-mounted wearable device of claim 1, further comprising:
a first mesh between the first output port and the first output aperture in the bracket;
a second mesh between the second output port and the second output aperture in the bracket;
a third mesh between the third output port and the first output feature in the bracket; and
a fourth mesh between the fourth output port and the second output feature in the bracket.

3. The head-mounted wearable device of claim 1, further comprising:
control circuitry that is connected to the first transducer and the second transducer using the flexible printed circuit, wherein the control circuitry drives the first transducer with a first electrical signal and the second transducer with a second electrical signal that is 180 degrees out of phase with the first electrical signal.

4. A head-mounted wearable device comprising:
a housing having an inner surface;
a first output port, a second output port, a third output port, and a fourth output port; and
an audio module comprising:
  a bracket having a first side and a second side, wherein the first side of the bracket is proximate to the inner surface of the housing;

a first transducer mounted within a first recess of the bracket, the first transducer having a first side and a second side;

a second transducer mounted within a second recess of the bracket, the second transducer having a first side and a second side;

a cover having a first side and a second side, wherein the first side of the cover is proximate to the second side of the bracket; and wherein:

the first recess includes a first duct that extends from the second side of the first transducer along at least a portion of an edge of the first transducer to a first output aperture in a perimeter of the bracket, and wherein the first output aperture corresponds to the first output port;

the second recess includes a second duct that extends from the second side of the second transducer along at least a portion of an edge of the second transducer to a second output aperture in the perimeter of the bracket, and wherein the second output aperture corresponds to the second output port;

a first portion of the bracket proximate to the first recess that includes a third duct extending from the first side of the first transducer to a first output feature in the perimeter of the bracket, wherein at least a portion of the third duct comprises a portion of the housing, and further wherein the first output feature corresponds to the third output port; and a second portion of the bracket proximate to the second recess includes a fourth duct extending from the first side of the second transducer to a second output feature in the perimeter of the bracket, wherein at least a portion of the fourth duct comprises a portion of the housing, and further wherein the second output feature corresponds to the fourth output port.

5. The head-mounted wearable device of claim 4, further comprising:

a first gasket between the inner surface of the housing and the first side of the bracket, wherein the first gasket comprises a first opening, that corresponds to the first output feature, and a second opening, that corresponds to the second output feature; and a second gasket that is between the first side of the cover and the second side of the bracket, wherein the second gasket extends along a perimeter of the cover and includes an internal divider that isolates the first recess from the second recess.

6. The head-mounted wearable device of claim 5, further comprising:

a first adhesive layer, affixed to an inside of the first recess, that joins the first transducer to the bracket, wherein the first adhesive layer has a third opening that corresponds to the first output feature; and a second adhesive layer, affixed to an inside of the second recess, that joins the second transducer to the bracket, wherein the second adhesive layer has a fourth opening that corresponds to the second output feature.

7. The head-mounted wearable device of claim 4, further comprising:

a first mesh between the first output port and the first output aperture in the bracket;

a second mesh between the second output port and the second output aperture in the bracket;

a third mesh between the third output port and the first output feature in the bracket; and a fourth mesh between the fourth output port and the second output feature in the bracket.

8. The head-mounted wearable device of claim 4, wherein:

the first output port and the second output port are positioned on a first surface of the housing; and the third output port and the fourth output port are positioned on a second surface of the housing.

9. The head-mounted wearable device of claim 4, wherein:

the first output port and the fourth output port are positioned on a first surface of the housing; and the second output port and the third output port are positioned on a second surface of the housing.

10. The head-mounted wearable device of claim 4, further comprising:

a front frame comprising a first hinge; and a first temple connected to the first hinge, wherein the first temple comprises the housing.

11. A device comprising:

a first transducer having a first side and a second side;

a second transducer having a first side and a second side;

a structure comprising:

a first recess, wherein the first transducer is mounted within the first recess;

a first duct that extends from the second side of the first transducer along at least a portion of an edge of the first transducer to a first output port;

a second recess, wherein the second transducer is mounted within the second recess;

a second duct that extends from the second side of the second transducer along at least a portion of an edge of the second transducer to a second output port;

a third duct extending from the first side of the first transducer to a third output port; and a fourth duct extending from the first side of the second transducer to a fourth output port;

a cover having a first side and a second side, wherein the first side of the cover is proximate to the structure; and a first gasket that is between the first side of the cover and the structure, wherein the first gasket extends along a perimeter of the cover and includes an internal divider that isolates the first recess from the second recess.

12. The device of claim 11, wherein:

the third duct comprises a first gap between the first side of the first transducer and an inner surface of the structure;

the fourth duct comprises a second gap between the first side of the second transducer and the inner surface of the structure; and further wherein the first duct, the second duct, the third duct, and the fourth duct are separate from one another.

13. The device of claim 11, further comprising:

a first adhesive layer affixed to an inside of the first recess that joins the first transducer to the structure, wherein the first adhesive layer has a first opening that corresponds to a portion of the third duct; and a second adhesive layer affixed to an inside of the second recess that joins the second transducer to the structure, wherein the second adhesive layer has a second opening that corresponds to a portion of the fourth duct.

14. The device of claim 11, wherein the structure has a first side and a second side, and further wherein:

the first output port and the second output port are positioned on the first side of the structure; and the third output port and the fourth output port are positioned on the second side of the structure.

15. The device of claim 11, wherein the structure has a first side and a second side, and further wherein:
- the first output port and the fourth output port are positioned on the first side of the structure; and
- the second output port and the third output port are positioned on the second side of the structure.

16. The device of claim 11, the structure further comprising a housing and a bracket, wherein the first duct, the second duct, the third duct, and the fourth duct at least partially comprise features in the bracket; and
- a first gasket between an inner surface of the housing and a first side of the bracket.

17. The device of claim 11, further comprising:
- control circuitry that is connected to the first transducer and the second transducer, wherein the control circuitry drives the first transducer with a first electrical signal and the second transducer with a second electrical signal that is 180 degrees out of phase with the first electrical signal.

18. The device of claim 11, the first transducer comprising:
- a first electromagnet;
- a first diaphragm mount magnetically coupled to the first electromagnet; and
- a first diaphragm affixed to the first diaphragm mount; and
the second transducer comprising:
- a second electromagnet;
- a second diaphragm mount magnetically coupled to the second electromagnet; and
- a second diaphragm affixed to the second diaphragm mount.

19. The device of claim 18, wherein the first output port, the second output port, the third output port, and the fourth output port are positioned along at least two outer edges of the structure, further wherein each of the at least two outer edges are not parallel to a plane of the first diaphragm and the second diaphragm.

20. The device of claim 11, wherein the structure further comprising a bracket having a first side and a second side, wherein the first side of the bracket is proximate to an inner surface of the housing; and
the device further comprising:
- a first mesh between the first output port and a first output aperture in the bracket;
- a second mesh between the second output port and a second output aperture in the bracket;
- a third mesh between the third output port and a first output feature in the bracket; and
- a fourth mesh between the fourth output port and a second output feature in the bracket.

21. A head-mounted wearable device comprising:
a housing having an inner surface;
a first output port, and a second output port; and
an audio module comprising:
- a first transducer having a first side and a second side;
- a second transducer having a first side and a second side;
- a first recess, wherein the first transducer is mounted within the first recess;
- a first duct that extends from the second side of the first transducer along at least a portion of an edge of the first transducer to the first output port;
- a second recess, wherein the second transducer is mounted within the second recess;
- a second duct that extends from the second side of the second transducer along at least a portion of an edge of the second transducer to the second output port;
- a third duct extending from the first side of the first transducer to a third output port; and
- a fourth duct extending from the first side of the second transducer to a fourth output port.

* * * * *

UNITED STATES PATENT AND TRADEMARK OFFICE
CERTIFICATE OF CORRECTION

| | | |
|---|---|---|
| PATENT NO. | : 10,904,667 B1 | Page 1 of 1 |
| APPLICATION NO. | : 15/925511 | |
| DATED | : January 26, 2021 | |
| INVENTOR(S) | : Xuan Zhong et al. | |

It is certified that error appears in the above-identified patent and that said Letters Patent is hereby corrected as shown below:

In the Claims

Column 15, Claim 16, Lines 7 and 8:
Currently read:
"comprising a housing and a bracket, wherein the first duct,"
Where they should read:
--comprising:
a housing;
a bracket, wherein the first duct,--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*